US012640885B2

(12) United States Patent
Liu

(10) Patent No.: US 12,640,885 B2
(45) Date of Patent: May 26, 2026

(54) METHOD AND DEVICE FOR ENHANCING UPLINK PHASE TRACKING REFERENCE SIGNAL (PT-RS)

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 338 days.

(21) Appl. No.: 18/553,121

(22) PCT Filed: Apr. 1, 2021

(86) PCT No.: PCT/CN2021/084930

§ 371 (c)(1),
(2) Date: Sep. 28, 2023

(87) PCT Pub. No.: WO2022/205306

PCT Pub. Date: Oct. 6, 2022

(65) Prior Publication Data

US 2024/0195571 A1      Jun. 13, 2024

(51) Int. Cl.
H04L 5/00          (2006.01)
H04W 24/02       (2009.01)
H04W 72/232     (2023.01)

(52) U.S. Cl.
CPC ......... H04L 5/0051 (2013.01); H04W 72/232 (2023.01)

(58) Field of Classification Search
None
See application file for complete search history.

(56) References Cited

U.S. PATENT DOCUMENTS

| | | | | |
|---|---|---|---|---|
| 2020/0382252 A1* | 12/2020 | Sun | ...................... | H04B 7/0626 |
| 2021/0143964 A1* | 5/2021 | Frenne | .................. | H04W 72/23 |
| 2021/0337548 A1* | 10/2021 | Gao | ...................... | H04L 5/0023 |
| 2022/0239410 A1* | 7/2022 | Lim | .................. | H04W 72/0446 |
| 2022/0239433 A1* | 7/2022 | Kim | ...................... | H04L 5/0051 |
| 2022/0311647 A1* | 9/2022 | Cheng | .................. | H04L 27/2675 |
| 2022/0312334 A1* | 9/2022 | Gao | ...................... | H04L 1/0003 |

(Continued)

FOREIGN PATENT DOCUMENTS

| CN | 110771078 A | 2/2020 |
|---|---|---|
| WO | 2020146141 A1 | 7/2020 |

OTHER PUBLICATIONS

International Search Report and Written Opinion of International Application No. PCT/CN2021/084930, dated Jan. 7, 2022, 14 pages.

(Continued)

*Primary Examiner* — Duc T Duong
(74) *Attorney, Agent, or Firm* — Finnegan, Henderson, Farabow, Garrett & Dunner, L.L.P.

(57)            ABSTRACT

A method for enhancing an uplink phase tracking reference signal (PT-RS) is performed by a network device, and includes: sending an indication message to a user equipment (UE), wherein the indication message includes a plurality of pieces of PT-RS indication information corresponding to a plurality of transmission reception points (TRPs), and the PT-RS indication information sent towards a corresponding TRP indicates a demodulation reference signal (DMRS) port associated with a corresponding PT-RS port.

14 Claims, 6 Drawing Sheets sending an indication message to a UE, wherein the indication message comprises a plurality of pieces of PT-RS indication information corresponding to a plurality of TRPs, the PT-RS indication information represents transmission towards a corresponding TRP and indicates a DMRS port associated with a corresponding PT-RS port

—101

(56)                References Cited

U.S. PATENT DOCUMENTS

| | | | | |
|---|---|---|---|---|
| 2023/0085874 A1* | 3/2023 | Khoshnevisan | ...... | H04L 5/0023 |
| | | | | 370/329 |
| 2023/0171763 A1* | 6/2023 | Gao | ...................... | H04W 52/08 |
| | | | | 370/329 |
| 2023/0232415 A1* | 7/2023 | Kim | .................... | H04W 72/232 |
| | | | | 370/329 |
| 2023/0328569 A1* | 10/2023 | Khoshnevisan | ..... | H04B 7/0639 |
| | | | | 370/252 |
| 2023/0371042 A1* | 11/2023 | Mei | ........................ | H04L 5/0051 |
| 2023/0403115 A1* | 12/2023 | Liu | ........................ | H04L 5/0051 |
| 2024/0214041 A1* | 6/2024 | Yuan | .................... | H04B 7/0473 |

OTHER PUBLICATIONS

LG Electronics, "Text proposals on enhancements on multi-TRP/ panel transmission", 3GPP TSG RAN WG1 #100bis, R1-2001913, e-Meeting, Apr. 20-30, 2020, 15 pages.

Notice of Reasons for Refusal issued by the Japanese Patent Office on Sep. 27, 2024, in corresponding Application No. 2023-560046, 10 pages.

"Enhancements on Multi-TRP for PDCCH, PUCCH and PUSCH", ZTE, 3GPP TSG RAN WG1 Meeting #104-e, R1-2100286, e-Meeting, Jan. 25-Feb. 5, 2021, 27 pages.

"Enhancements on multi-TRP for PDCCH, PUCCH and PUSCH", OPPO, 3GPP TSG RAN WG1 Meeting #104-e, R1-2100119, e-Meeting, Jan. 25-Feb. 5, 2021, 18 pages.

Extended European Search Report Issued in Application No. 21933965.2 dated Jan. 14, 2025, 10 pages.

"Summary #3 of Multi-TRP for PUCCH and PUSCH", Moderator (Nokia), 3GPP TSG RAN WG1 Meeting #104-e, R1-2102060, e-Meeting, Jan. 25-Feb. 5, 2021, 43 pages.

"Enhancements on Multi-TRP for PDCCH, PUCCH and PUSCH", LG Electronics, 3GPP TSG RAN WG1 #104-e, R1-2100619, e-Meeting, Jan. 25-Feb. 5, 2021, 8 pages.

Office Action issued by the Intellectual Property India Patent Office on Mar. 7, 2025, in corresponding Application No. IN 2023-47074613, 6 pages.

* cited by examiner sending an indication message to a UE, wherein the indication message comprises a plurality of pieces of PT-RS indication information corresponding to a plurality of TRPs, the PT-RS indication information represents transmission towards a corresponding TRP and indicates a DMRS port associated with a corresponding PT-RS port

Figures 4, 5, 6, 7:
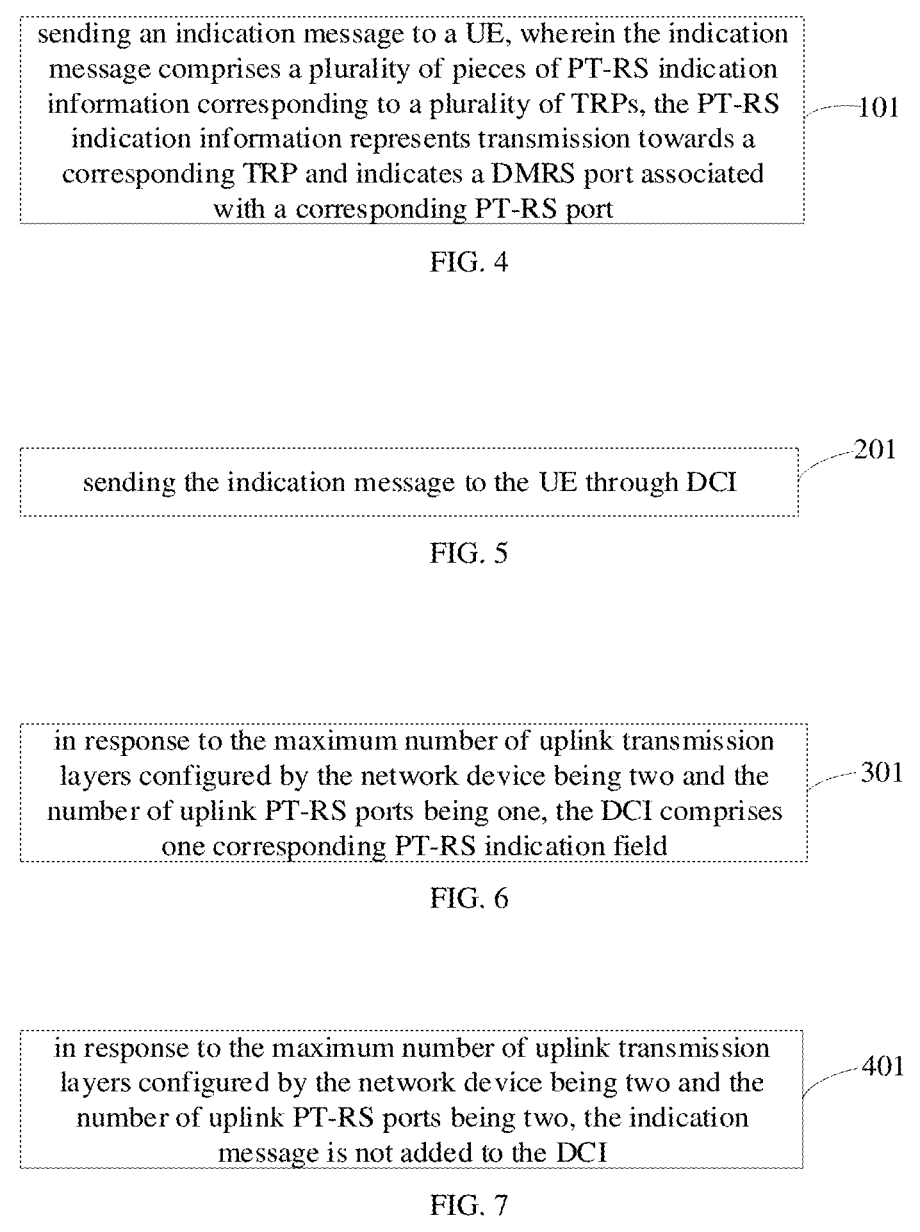

— 101

FIG. 4 sending the indication message to the UE through DCI

— 201

FIG. 5 in response to the maximum number of uplink transmission layers configured by the network device being two and the number of uplink PT-RS ports being one, the DCI comprises one corresponding PT-RS indication field

— 301

FIG. 6 in response to the maximum number of uplink transmission layers configured by the network device being two and the number of uplink PT-RS ports being two, the indication message is not added to the DCI

— 401

FIG. 7 in response to the maximum number of uplink transmission layers configured by the network device being one, the indication message is not added to the DCI ⟋501

FIG. 8 in response to the maximum number of uplink transmission layers configured by the network device being greater than two, the DCI comprises two corresponding independent PT-RS indication fields ⟋601

FIG. 9 receiving a supported number of cyclic mapping DMRS ports reported by the UE and the number of DMRS ports configured by the network device ⟋701

FIG. 10 receiving an indication message sent by a network device, wherein the indication message comprises a plurality of pieces of PT-RS indication information corresponding to a plurality of TRPs, the PT-RS indication information represents transmission towards a corresponding TRP and indicates a DMRS port associated with a corresponding PT-RS port ⟋801

FIG. 11 apparatus 1200 for enhancing
an uplink PT-RS sending module 1201

FIG. 12 apparatus 1300 for enhancing
an uplink PT-RS receiving module 1301

FIG. 13

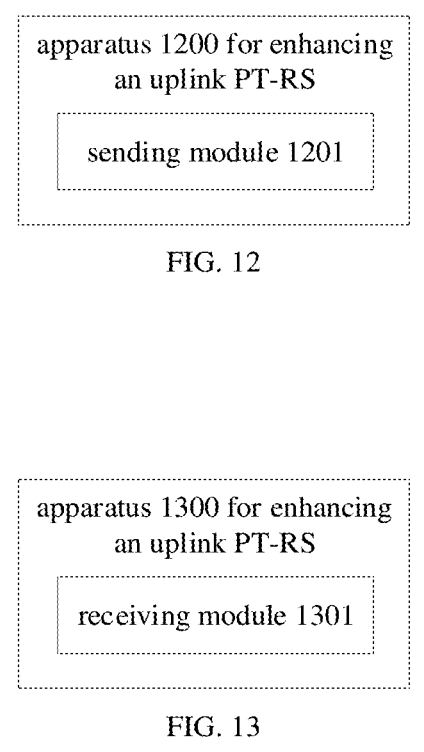

METHOD AND DEVICE FOR ENHANCING UPLINK PHASE TRACKING REFERENCE SIGNAL (PT-RS)

CROSS-REFERENCE TO RELATED APPLICATION

This application is the U.S. national application of International Application No. PCT/CN2021/084930, filed on Apr. 1, 2021, the entire contents of which are incorporated herein by reference.

TECHNICAL FIELD

The present disclosure relates to a field of wireless communication technologies, and particularly to a method and an apparatus for enhancing an uplink phase tracking reference signal (PT-RS), and a communication device.

BACKGROUND

The application of a plurality of transmission reception points or antenna panels (multi-TRP/PANEL) in a base station is mainly to improve the coverage at the edge of the cell, provide a more balanced service quality in the service area, and perform coordinate data transmission among the multi-TRP/PANEL in different methods. From the perspective of network topology, network deployment is performed in a manner of a large number of distributed access points and centralized baseband processing, which may be more conducive to providing a balanced user experience rate, and significantly reduce the delay and signaling overhead caused by handover. A transmission/reception of channels is performed on a plurality of beams with a plurality of angles using a cooperation between the multi-TRP/PANEL, which may overcome various shielding/blocking effects better and ensure the robustness of link connections, and is suitable for ultra reliable and low latency communication (URLLC) service requirements of improving a transmission quality and satisfying a reliability.

In an Release 16 research stage, transmission enhancement is performed on a physical downlink shared channel (PDSCH) based on an application of multi-point cooperative transmission technology between downlink multi-TRP/PANEL. Since data transmission includes a scheduling feedback of uplink and downlink channels, in the research of URLLC, only enhancing a downlink data channel cannot guarantee an overall service performance. Therefore, in the research of Release 17, a physical downlink control channel (PDCCH), a physical uplink control channel(PUCCH) and a physical uplink shared channel (PUSCH) continue to be enhanced.

In the multi-TRP based PUSCH enhancement, the main existing solution for PUSCH transmission controlled by a single downlink control information (DCI) is that, two independent scheduling request indication (SRI) fields are used in DCI 0_1/0_2 to correspond to SRI indications towards different TRPs, so as to control the PUSCH transmission towards different TRPs.

In the PUSCH transmissions towards different TRPs, different common phase errors (CPEs) noise sources present in a terminal on the Frequency Range 2 (FR2) may cause that transmission processes towards different TRPs are not identical. The strongest demodulation reference signal (DMRS) port associated with a phase tracking reference signal (PT-RS) sent towards one of the TRPs is not necessarily the same as the strongest DMRS port associated with the PT-RS sent towards another TRP. Therefore, it is a need to consider a redefinition of a correlation relationship between the PT-RS and the different DMRS ports scheduled by a UE uplink, that is, a correlation enhancement. Otherwise, the estimation accuracy of PT-RS cannot be guaranteed, the compensation effect for CPE may be reduced, and the system performance may be affected.

SUMMARY

A first aspect of the disclosure provides a method for enhancing an uplink phase tracking reference signal (PT-RS), applied to a network device. The method includes: sending an indication message to a user equipment (UE), in which the indication message includes a plurality of pieces of PT-RS indication information corresponding to a plurality of transmission reception points (TRPs), and the PT-RS indication information sent towards a corresponding TRP indicates a demodulation reference signal (DMRS) port associated with a corresponding PT-RS port.

A second aspect of the disclosure provides a method for enhancing an uplink PT-RS, applied to a UE. The method includes: receiving an indication message sent by a network device, in which the indication message includes a plurality of pieces of PT-RS indication information corresponding to a plurality of TRPs, and the PT-RS indication information sent towards a corresponding TRP indicates a DMRS port associated with a corresponding PT-RS port.

A third aspect of the disclosure provides a user equipment, including: a transceiver: a memory: and a processor, respectively connected to the transceiver and the memory. The processor is configured to implement the method for enhancing an uplink PT-RS as described in the first aspect by executing computer-executable instructions on the memory.

BRIEF DESCRIPTION OF THE DRAWINGS

Example embodiments will be described in detail below in conjunction with the accompanying drawings.

FIG. 4 is a schematic flowchart of a method for enhancing an uplink PT-RS according to an embodiment of the disclosure.

FIG. 5 is a schematic flowchart of another method for enhancing an uplink PT-RS according to an embodiment of the disclosure.

FIG. 6 is a schematic flowchart of another method for enhancing an uplink PT-RS according to an embodiment of the disclosure.

FIG. 7 is a schematic flowchart of another method for enhancing an uplink PT-RS according to an embodiment of the disclosure.

FIG. 8 is a schematic flowchart of another method for enhancing an uplink PT-RS according to an embodiment of the disclosure.

FIG. 9 is a schematic flowchart of another method for enhancing an uplink PT-RS according to an embodiment of the disclosure.

FIG. 10 is a schematic flowchart of another method for enhancing an uplink PT-RS according to an embodiment of the disclosure.

FIG. 11 is a schematic flowchart of another method for enhancing an uplink PT-RS according to an embodiment of the disclosure.

FIG. 12 is a structural schematic diagram of an apparatus for enhancing an uplink PT-RS according to an embodiment of the disclosure.

FIG. 13 is a structural schematic diagram of another apparatus for enhancing an uplink PT-RS according to an embodiment of the disclosure.

DETAILED DESCRIPTION

Figure 1:
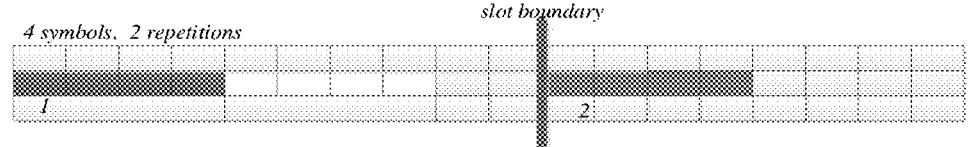
FIG. 1 is an example diagram of PUSCH repetition type A according to an embodiment of the disclosure.

The embodiments may be described in detail herein, examples of which are illustrated in the accompanying drawings. When the following description refers to the drawings, the same numbers in different drawings refer to the same or similar elements unless otherwise indicated. The implementations described in the following embodiments do not represent all the implementations consistent with the embodiments of the disclosure. Rather, they are merely examples of apparatuses and methods consistent with aspects of the disclosure as detailed in the appended claims.

The terminology used in the disclosure is only for the purpose of describing specific embodiments and is not intended to limit the embodiments of the disclosure. As used in the embodiments of the disclosure and the appended claims, the singular forms "a", "an" and "the" are intended to include the plural forms as well, unless the context clearly dictates otherwise. It may also be understood that the term "and/or" as used herein refers to and includes any and all possible combinations of one or more of the associated listed items.

It should be understood that although the terms first, second, third, etc. may be used to describe various information in the embodiments of the disclosure, the information should not be limited to these terms. These terms are only used to distinguish information of the same type from each other. For example, without departing from the scope of the embodiments of the disclosure, first information may also be called second information, and similarly, second information may also be called first information. Depending on the context, the words "if" and "in case of" as used herein may be interpreted as "when" or "upon" or "in response to determining."

The embodiments of the disclosure are described in detail below, examples of which are illustrated in the accompanying drawings, throughout which the same or similar reference numerals refer to the same or similar elements. The embodiments described below with reference to the accompanying drawings are exemplary, intended to explain the disclosure and are not to be construed as limitations of the disclosure.

With the method and apparatus for enhancing an uplink PT-RS, and a communication device, the network device sends an indication message to the UE, in which the indication message includes a plurality of pieces of PT-RS indication information corresponding to a plurality of TRPs, the PT-RS indication information represents transmission towards a corresponding TRP and indicates a DMRS port associated with a corresponding PT-RS port. Since the indication message sent to the UE includes the plurality of pieces of PT-RS indication information sent towards the TRPs, and each piece of PT-RS indication information indicates the DMRS port associated with the corresponding PT-RS port, a problem is solved that the PT-RS is unable to associate with DMRS ports for different CPE noise sources in the multi-TRP based PUSCH transmission, which is beneficial to improving the system performance.

A phase noise (PN) is caused by the execution of a local oscillator destroying the orthogonality of each subcarrier in an orthogonal frequency division multiplexing (OFDM) system, which causes a common phase error (CPE) that leads to a rotation of a modulated constellation at a fixed angle, an inter-carrier interference (ICI), and scattering of constellation points. This situation is more obvious at high frequencies. Since CPE has a great impact, compensation for CPE is mainly considered in New Radio (NR). In NR, a PT-RS is designed for CPE estimation. In order to enhance a signal coverage and improve a signal quality, PT-RS as a UE-specific reference signal is configured by a network device to a terminal. PT-RS is used to track PNs introduced by the local oscillator in the gNB and UE. PT-RS may be regarded as an extension of a demodulation reference signal (DMRS). PT-RS and DMRS have a close relationship, such as using the same precoding, port correlation, generation of an orthogonal sequence, a quasi co-located (QCL) relationship, etc.

A number of PT-RS ports is related to a number of PN sources. When there are a plurality of independent PN sources, each PN source needs a PT-RS port for phase estimation. Therefore, NR 15/16 supports 1 downlink (DL) PT-RS port and 2 uplink (UL) PT-RS ports.

Whether to transmit a PT-RS in UL is also controlled via a configuration of high layer parameters. If the PT-RS is not configured for the UE in the higher layer parameters, the UE does not transmit the UL PT-RS. If the high layer configures a parameter that contain PT-RS signals for the UE and the number of PT-RS ports is 1 or 2, then a PTRS-DMRS association indication field in UL DCI 0_1/0_2 is used to indicate one DM-RS port is associated with this PT-RS port. When the number of PT-RS ports is 1, a specific association is shown in Table 1 below:

TABLE 1

| Value | DMRS port |
|-------|-----------|
| 0 | $1^{st}$ scheduled DMRS port |
| 1 | $2^{nd}$ scheduled DMRS port |
| 2 | $3^{rd}$ scheduled DMRS port |
| 3 | $4^{th}$ scheduled DMRS port | where Value in Table 1 is a numerical value indicated, and DMRS port explains a corresponding port number relationship for the numerical value indicated by Value. When the numerical value indicated by Value is 0, the $1^{st}$ scheduled DMRS port is associated with the PT-RS port: when the numerical value indicated by Value is 1, the $2^{nd}$ scheduled DMRS port is associated with the PT-RS port: when the numerical value indicated by Value is 2, the $3^{rd}$ scheduled DMRS port is associated with the PT-RS port: when the numerical value indicated by Value is 3, the $4^{th}$ scheduled DMRS port is associated with the PT-RS port.

The maximum number of PT-RS ports is configured by high layer parameters. If the indicated maximum number of PT-RS ports is 2, then the network device divides the DMRS ports corresponding to the sounding reference signal (SRS) resources into two groups and respective association relationships are established.

When the number of PT-RS ports is 2, the specific association is shown in Table 2 below:

TABLE 2

| Value of MSB | DMRS port | Value of LSB | DMRS port |
|---|---|---|---|
| 0 | 1st DMRS port which shares PTRS port 0 | 0 | 1st DMRS port which shares PTRS port 1 |
| 1 | 2nd DMRS port which shares PTRS port 0 | 1 | 2nd DMRS port which shares PTRS port 1 |

Where Value of MSB refers to a numerical value indicated by the most significant bit (MSB), and Value of LSB refers to a numerical value indicated by the least significant bit (LSB). When the numerical value indicated by the MSB is 0, PT-RS port 0 is associated with the $1^{st}$ DMRS port that shares the PT-RS port 0. When the numerical value indicated by the MSB is 1, PT-RS port 0 is associated with the $2^{nd}$ DMRS port that shares the PT-RS port 0. When the numerical value indicated by the LSB is 0, PT-RS port 1 is associated with the $1^{st}$ DMRS port that shares the PT-RS port 1. When the numerical value indicated by the LSB is 1, PT-RS port 1 is associated with the $2^{nd}$ DMRS port that shares the PT-RS port 1.

It may be understood that each element in Table 1 and Table 2 exists independently. These elements are exemplarily listed in the same table, but it does not mean that all elements in the table must be simultaneously existed as shown in the table. The value of each element is not dependent on the value of any other element in Table 1 and Table 2. Therefore, those skilled in the art may understand that the value of each element in Table 1 and Table 2 is an independent embodiment.

The UL transmission scheme of PUSCH includes two schemes: codebook-based UL transmission and non-codebook UL transmission. For PUSCH transmission towards different TRPs, direction information may be indicated through a scheduling request indication (SRI) field in DCI signaling. Currently, testing data management (TDM) repetition modes of PUSCH mainly include PUSCH repetition type A and PUSCH repetition type B.

In the PUSCH repetition type A, repetition transmission over slots is configured by a radio resource control (RRC) signaling. The same transport block (TB) is repeatedly transmitted at a plurality of transmission occasions (TOs). Since signal instructions at the cell edge are not very good, a message needs to be repeatedly transmitted for several times. Therefore, this transmission type is mainly used at the cell edge, and a number of transmission layers is limited to a single-side transmission. A PUSCH is transmitted in K consecutive slots (that is, at K TOs). The transmission starts from the S-th symbol in a starting slot. Each repetition lasts for L symbols. At the same time, transmission S+L cannot exceed the slot boundary.

FIG. 1 is an example diagram of PUSCH repetition type A according to an embodiment of the disclosure. As shown in FIG. 1, the same TB is repeatedly transmitted at two TOs or for two repetitions, and each repetition lasts for 4 symbols.

In the PUSCH repetition type B, this transmission type may realize back-to-back transmission of the same TB, and may cross the slot boundary. This transmission type does not have a limit on a number of transmission layers and may support data transmission on UL layers 1-4. In the time domain, a PUSCH transmission starts from the S-th symbol in the starting slot, and back-to-back PUSCH transmission is performed at K TOs or for K nominal repetitions. Each nominal repetition occupies L symbols in a back-to-back way, transmission S+L may cross the slot boundary.

Figure 2:
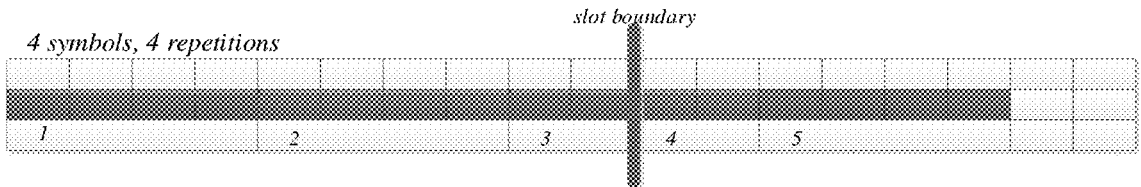
FIG. 2 is an example diagram of PUSCH repetition type B according to an embodiment of the disclosure.

FIG. 2 is an example diagram of a PUSCH repetition type B according to an embodiment of the disclosure. As shown in FIG. 2, a PUSCH transmission starts from the $4^{th}$ symbol in the starting slot, and back-to-back PUSCH transmission is performed at 4 TOs or for 4 repetitions. Each repetition occupies 4 symbols in a back-to-back way, and the transmission may cross the slot boundary, thereby completing repeated transmission of the PUSCH over a slot length greater than one slot.

Figure 3:
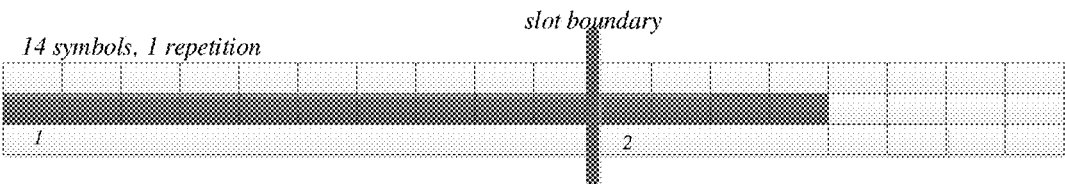
FIG. 3 is an example diagram of another PUSCH repetition type B according to an embodiment of the disclosure.

FIG. 3 is an example diagram of another PUSCH repetition type B according to an embodiment of the disclosure. As shown in FIG. 3, a PUSCH transmission starts from the $4^{th}$ symbol in the starting slot, back-to-back PUSCH transmission is performed at one TO or for one repetition. The repetition occupies 14 symbols in a back-to-back way, and the transmission may cross the slot boundary, thereby completing repeated transmission of the PUSCH over a slot length greater than one slot.

For the PUSCH based on multi-TRP transmission, the terminal jointly transmits the unified TB of PUSCH towards different TRPs to further obtain the space diversity gain and improve the transmission reliability. The transmissions corresponding to different beam directions may be mapped to different TOs. Specifically, a plurality of repeated transmissions of TB may be mapped to K specific TOs through a plurality of possible mapping rules below. Therefore, the TOs corresponding to beam transmissions towards different TRPs is divided into two groups. The following takes K=8 as an example. For example, the mapping rules are cyclic mapping: 12121212; sequential mapping: 11221122; half-half mapping: 11112222.

In the PUSCH transmissions towards different TRPs, different CPE noise sources present in the terminal may cause transmission processes towards different TRPs are not identical. The strongest demodulation reference signal (DMRS) port associated with a PT-RS sent towards one of the TRPs is not necessarily the same as the strongest DMRS port associated with the PT-RS sent towards another TRP. Therefore, it is a need to consider a redefinition of a correlation relationship between the PT-RS and the different DMRS ports scheduled by a UE uplink, that is, a correlation enhancement. Otherwise, the estimation accuracy of PT-RS cannot be guaranteed, the compensation effect for CPE may be reduced, and the system performance may be affected.

In view of the above problems, the disclosure provides a method and an apparatus for enhancing a PT-RS, and a communication device.

FIG. 4 is a schematic flowchart of a method for enhancing an uplink PT-RS according to an embodiment of the disclosure. The method for enhancing an uplink PT-RS may be applied to a network device.

The network device may include an access network device and a core network device, where the access network device takes a base station as an example. The base station may include a plurality of cells that provide services to the terminal device. Depending on the specific application scenarios, each cell may contain a plurality of TRPs. Alternatively, the base station may be a device in the access network that communicates with wireless terminal devices through one or more sectors on a radio interface, or other names. For example, the base station may be a Base Transceiver Station (BTS) in Global System for Mobile communications (GSM) or Code Division Multiple Access (CDMA), or may be a base station (NodeB) in Wide-band Code Division Multiple Access (WCDMA), or may be an evolutional Node B (referred to as eNB or e-NodeB) in a long term evolution (LTE) system, a 5G base station (referred to as gNB) in the 5G network architecture (next generation system), or a Home evolved Node B (HeNB), a relay node, a femto, a pico, etc., which is not limited in the embodiments of the disclosure.

As shown in FIG. 4, the method for enhancing an uplink PT-RS may include the following steps.

At 101, an indication message is sent to a user equipment (UE). The indication message includes a plurality of pieces of PT-RS indication information corresponding to a plurality of TRPs, and the PT-RS indication information represents transmission towards a corresponding TRP and indicates a demodulation reference signal (DMRS) port associated with a corresponding PT-RS port.

The terminal device may refer to a device that provides voice and/or data connectivity to a user, a handheld device with a wireless connection function, or other processing device connected to a wireless modem, etc. In different systems, the names of terminal device may also be different. For example, in a 5G system, the terminal device may be called UE. The wireless terminal device may communicate with one or more core networks (CNs) via a radio access network (RAN), and the wireless terminal device may be a mobile terminal device, such as a mobile phone (also referred to be as a "Cellular" telephone) and a computer with a mobile terminal device, which may be, for example, a portable, pocket-sized, handheld, computer-built-in or vehicle-mounted mobile device that exchanges speech and/ or data with the radio access network.

For example, the terminal device may be a personal communication service (PCS) phone, a cordless phone, a session initiated protocol (SIP) phone, a wireless local loop (WLL) station, a personal digital assistant (PDA) and other devices. The wireless terminal device may also be called a system, a subscriber unit, a subscriber station, a mobile station, a mobile, a remote station, or an access point, a remote terminal, an access terminal, a user terminal equipment, a user agent, a user device, which is not limited in the embodiments of the disclosure.

In the embodiment of the disclosure, in the PUSCH repeated transmission, due to the influence of channel changes and estimation delays, it is difficult for the DMRS port associated with the PT-RS to remain unchanged at a plurality of TOs. Therefore, for the PUSCH transmission towards different TRPs, the network device sends an indication message to the UE that includes a plurality of pieces of PT-RS indication information, which indicate and correspond to a plurality of TRPs.

As the oscillator carrier frequency increases, the PN will also increase. For the 5G wireless network operating in high frequency bands (such as millimeter wave bands), the PT-RS may be used to eliminate the PN. PT-RS is a UE-specific reference signal (that is, PT-RS of each UE is different), which can be beamformed and included in scheduled resources. A number of PT-RS ports may be less than a total number of ports, and the orthogonality among the PT-RS ports may be achieved through frequency-division multiplexing (FDM). In addition, configuration of the PT-RS is based on a oscillator quality, a carrier frequency, an orthogonal frequency division multiplexing (OFDM) sub-carrier spacing, scheduling and coding format for signal transmission.

The PT-RS indication information represents transmission towards a corresponding TRP and indicates a DMRS port associated with a corresponding PT-RS port.

With the method for enhancing an uplink PT-RS in the embodiment of the disclosure, the indication message is sent to the UE from the network device. The indication message includes pieces of PT-RS indication information corresponding to the plurality of TRPs, the PT-RS indication information represents transmission towards the corresponding TRP and indicates the DMRS port associated with the corresponding PT-RS port. Since the indication message sent to the UE includes the pieces of PT-RS indication information sent towards the corresponding TRP, and each PT-RS indication information indicates the DMRS port associated with the corresponding PT-RS port, a problem is solved that the PT-RS is unable to associate with DMRS ports for different CPE noise sources in the multi-TRP based PUSCH transmission, which is beneficial to improving the system performance.

It should be noted that the above possible implementations may be executed individually or in combination, which are not limited in the embodiments of the disclosure.

An embodiment of the disclosure provides another method for enhancing an uplink PT-RS. FIG. 5 is a schematic flowchart of another method for enhancing an uplink PT-RS according to an embodiment of the disclosure. The method for enhancing an uplink PT-RS can be applied to a network device. The method for enhancing an uplink PT-RS may be executed alone, or may be executed in combination with any embodiment or possible implementation in the embodiment, or may be executed in combination with any technical solution in the related art.

As shown in FIG. 5, the method for enhancing an uplink PT-RS may include the following steps.

At 201, an indication message is sent to the UE through downlink control information (DCI).

In the embodiment of the disclosure, the network device may send the indication message to the UE through DCI.

The indication message includes pieces of PT-RS indication information corresponding to a plurality of TRPs. The PT-RS indication information represents transmission towards a corresponding TRP and indicates a DMRS port associated with a corresponding PT-RS port.

In the embodiment of the disclosure, the indication message may be determined based on a maximum number of uplink transmission layers supported by the UE in a current BWP configured by the network device and a number of PT-RS ports corresponding to the uplink transmission of the UE configured by the network device.

In the embodiment of the disclosure, PUSCHs towards the plurality of TRPs transmit respective independent PT-RS reference signals, where each port of the PT-RS is associated with a DMRS port in the same TRP transmission direction. This solves the technical problem that PT-RS is unable to associate with DMRS ports for different CPE noise sources during the multi-TRP based PUSCH transmission.

It should be noted that the above possible implementations may be executed individually or in combination, which are not limited in the embodiments of the disclosure.

An embodiment of the disclosure provides another method for enhancing an uplink PT-RS. FIG. 6 is a schematic flowchart of another method for enhancing an uplink PT-RS according to an embodiment of the disclosure. The method for enhancing an uplink PT-RS may be applied to the network device. The method for enhancing an uplink PT-RS may be executed alone, or may be in combination with any embodiment or possible implementation in the embodiment, or may be in combination with any technical solution in the related art.

As shown in FIG. 6, the method for enhancing an uplink PT-RS may include the following steps.

At 301, in response to the maximum number of uplink transmission layers configured by the network device being two and the number of uplink PT-RS ports being one, the DCI includes one corresponding PT-RS indication field.

In the embodiment of the disclosure, if the maximum number of uplink transmission layers configured by the network device is two and the number of uplink PT-RS ports is one, the indication message includes a first PT-RS indication field, and the first PT-RS indication field includes respective PT-RS indication information corresponding to PT-RSs sent in a plurality of TRP transmission directions. That is, respective PT-RS indication information included in the first PT-RS indication field has a one-to-one correspondence with a plurality of TRPs.

For example, assuming that beams are transmitted to two TRPs, the first PT-RS indication field may include PT-RS indication information corresponding to the TRP1 transmission direction and PT-RS indication information corresponding to the TRP2 transmission direction.

The PT-RS indication information represents transmission in the corresponding TRP direction and indicates the DMRS port that is associated with the PT-RS port used by the PT-RS sent in the corresponding TRP direction. That is, the PT-RS port indicated by the PT-RS indication information has a one-to-one correspondence with the associated DMRS port.

In the embodiment of the disclosure, in all TOs for transmission towards the plurality of TRPs, the PT-RS port is mapped in the PT-RS indication information, so that a DMRS port, indicated by the PT-RS indication information and associated with the corresponding PT-RS port, is used to send the PT-RS.

It is predefined or preconfigured that a set of DMRS ports is associated with each PT-RS port in the plurality of TRP transmission directions, in which the set of DMRS ports includes a DMRS port for sending the PT-RS.

For example, when the number of uplink PT-RS ports is one and beams are transmitted to two TRPs, the MSB is used to indicate the PT-RS sent towards TRP1 is associated with a corresponding DMRS port that shares the PT-RS port, and LSB is used to indicate the PT-RS sent towards TRP2 is associated with a corresponding DMRS port that shares the PT-RS port. In all TOs for transmission towards TRP1, the DMRS port indicated by MSB is used to send a PT-RS; and in all TOs for transmission towards TRP2, the DMRS port indicated by LSB is used to send a PT-RS.

In the embodiment of the disclosure, when the UE reports that a PT-RS cyclic mapping mode is supported and the network device configures the UE to perform mapping based on the cyclic mapping mode, each PT-RS port is cyclically mapped onto different DMRS ports associated with the PT-RS port, among all ports consisting of a set of DMRS ports associated with each PT-RS port configured by the network device, to send the PT-RS, and the PT-RS is sent by using the DMRS port associated with the PT-RS port at different TOs in a corresponding TRP transmission direction.

The DMRS port indicated by the PT-RS indication information is mapped to a first start TO in the corresponding TRP transmission direction.

For example, in all TOs for transmission towards TRP1, the PT-RS ports are cyclically mapped onto a set of DMRS ports corresponding to a sharing configuration, and the DMRS port indicated by MSB is mapped to the first start TO in the beam direction. In all TOs for transmission towards TRP2, the PT-RS ports are cyclically mapped onto a set of DMRS ports corresponding to a sharing configuration, and the DMRS port indicated by LSB is mapped to the first start TO in the beam direction.

In the embodiment of the disclosure, a mapping between beams and TOs for transmission towards different TRPs may adopt a cyclic mapping or a sequential mapping, and PT-RSs map to different TOs according to the same rules.

With the method for enhancing an uplink PT-RS in the embodiment of the disclosure, when the maximum number of uplink transmission layers configured by the network device is two and the number of uplink PT-RS ports is one, the DCI includes one corresponding PT-RS indication field. Therefore, when beams are transmitted to a plurality of TRPs, the PT-RS indication field included in the DCI includes pieces of PT-RS indication information having one-to-one correspondence with the plurality of TRPs, which indicates the DMRS port is associated with the corresponding PT-RS port, and thus avoids a problem of inaccurate PN estimation due to channel changes and estimation delays.

It should be noted that the above possible implementations may be executed individually or in combination, which are not limited in the embodiments of the disclosure.

An embodiment of the disclosure provides another method for enhancing an uplink PT-RS. FIG. 7 is a schematic flowchart of another method for enhancing an uplink PT-RS according to an embodiment of the disclosure. The method for enhancing an uplink PT-RS may be applied to the network device. The method for enhancing an uplink PT-RS may be executed alone, or may be in combination with any embodiment or possible implementation in the embodiment, or may be in combination with any technical solution in the related art.

As shown in FIG. 7, the method for enhancing an uplink PT-RS may include the following steps.

At 401, in response to the maximum number of uplink transmission layers configured by the network device being two and the number of uplink PT-RS ports being two, the indication message is not added to the DCI.

In the embodiment of the disclosure, if the maximum number of uplink transmission layers configured by the network device and supported by the UE in the current BWP is two, and the number of uplink PT-RS ports is two, the indication message is not added to the DCI. The network side device directly sends DCI to UE.

It may be understood that the number of uplink PT-RS ports is two, in which one PT-RS port corresponds to one DMRS port. Therefore, there is no need to add an indication message in the DCI, the DMRS port associated with the PT-RS port may be also determined. This avoids the problem of inaccurate PN estimation due to channel changes and estimation delays.

It should be noted that the above possible implementations may be executed individually or in combination, which are not limited in the embodiments of the disclosure.

Figures 8, 9, 10, 11:
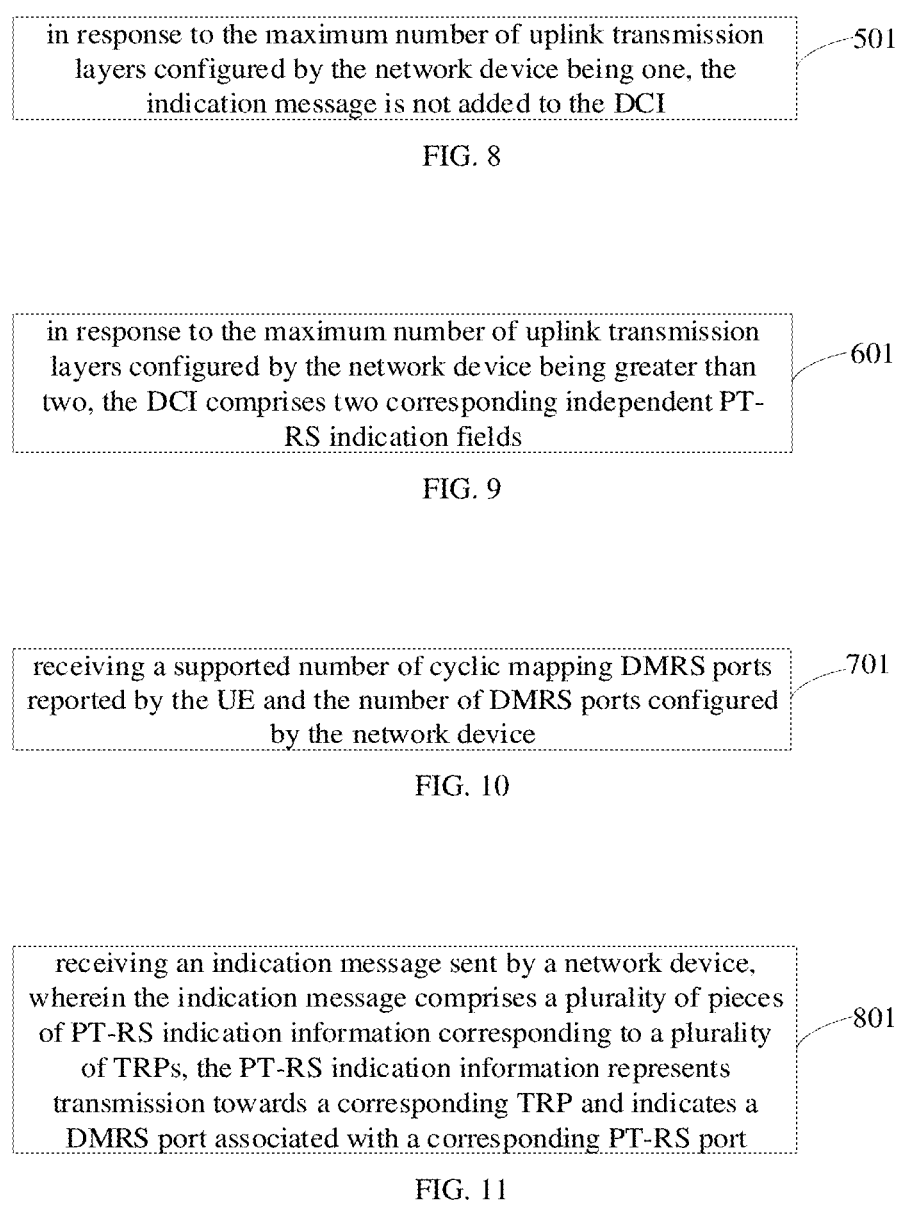

An embodiment of the disclosure provides another method for enhancing an uplink PT-RS. FIG. 8 is a schematic flowchart of another method for enhancing an uplink PT-RS according to an embodiment of the disclosure. The method for enhancing an uplink PT-RS may be applied to the network device. The method for enhancing an uplink PT-RS may be executed alone, or may be in combination with any embodiment or possible implementation in the embodiment, or may be in combination with any technical solution in the related art.

As shown in FIG. 8, the method for enhancing an uplink PT-RS may include the following steps.

At 501, in response to the maximum number of uplink transmission layers configured by the network device being one, the indication message is not added to the DCI.

In the embodiment of the disclosure, when the maximum number of uplink transmission layers configured by the network device and supported by UE in the current BWP is one, no indication message is added to the DCI. The network side device directly sends DCI to the UE.

It may be understood that when single-layer transmission is supported by the UE in the current BWP and configured by the network device, there is one PT-RS port and a DMRS port corresponding to the PT-RS port, and no distinction is needed.

It should be noted that the above possible implementations may be executed individually or in combination, which are not limited in the embodiments of the disclosure.

An embodiment of the disclosure provides another method for enhancing an uplink PT-RS. FIG. 9 is a schematic flowchart of another method for enhancing an uplink PT-RS according to an embodiment of the disclosure. The method for enhancing an uplink PT-RS may be applied to the network device. The method for enhancing an uplink PT-RS may be executed alone, or may be in combination with any embodiment or possible implementation in the embodiment, or may be in combination with any technical solution in the related art.

As shown in FIG. 9, the method for enhancing an uplink PT-RS may include the following steps.

At 601, in response to the maximum number of uplink transmission layers configured by the network device being greater than two, the DCI includes two corresponding independent PT-RS indication fields.

In the embodiment of the disclosure, when the maximum number of uplink transmission layers configured by the network device and supported by the UE in the current BWP is greater than two, the DCI includes two corresponding independent PT-RS indication fields when the network device sends the indication message to the UE through DCI.

In a possible situation of the embodiment of the disclosure, if the maximum number of uplink transmission layers configured by the network device and supported by the UE in the current BWP is greater than two, and the number of uplink PT-RS ports is one, the indication message includes a plurality of second PT-RS indication fields, each of which corresponds to a TRP. The second PT-RS indication field represents transmission towards a corresponding TRP and indicates a DMRS port associated with a corresponding PT-RS port.

For example, when the maximum number of uplink transmission layers configured by the network device and supported by the UE in the current BWP is 3 or 4, and when beams are transmitted to two TRPs, the indication message sent by the network device to the UE includes two second PT-RS indication fields, one of which indicates transmission towards TRP1 and a DMRS port associated with a corresponding PT-RS port, the other of which indicates transmission towards TRP2 and a DMRS port associated with a corresponding PT-RS port.

In the embodiment of the disclosure, in all TOs for transmission towards the plurality of TRPs, the PT-RS port is mapped onto the DMRS port indicated by the second PT-RS indication field to send the PT-RS. It is predefined or preconfigured a set of DMRS ports associated with the PT-RS port in a plurality of TRP transmission directions, in which the set of DMRS ports includes a DMRS port for sending the PT-RS.

For example, when beams are sent to TRP1 and TRP2 at the same time, in all TOs for transmission towards TRP1, the PT-RS port is mapped onto the DMRS port indicated by the $1^{st}$ second PT-RS indication field for sending the PT-RS: and in all TOs for transmission towards TRP2, the PT-RS port is mapped onto the DMRS port indicated by the $2^{nd}$ second PT-RS indication field for sending the PT-RS.

In the embodiment of the disclosure, when the UE reports that a PT-RS cyclic mapping mode is supported and the network device configures the UE to perform mapping based on the cyclic mapping mode, the PT-RS port is cyclically carried on different DMRS ports, among all ports corresponding to a set of associated DMRS ports configured by the network device, and the different DMRS ports are mapped to corresponding different TOs for transmission towards a corresponding TRP.

The DMRS port indicated by the second PT-RS indication field is mapped to a first start TO in the corresponding TRP transmission direction.

For example, when beams are transmitted to TRP1 and TRP2 at the same time, in all TOs for transmission towards TRP1, a set of DMRS ports corresponding to the sharing configuration are in an cyclic mapping mode, the DMRS port indicated by the $1^{st}$ second PT-RS indication field is mapped to the first start TO in the corresponding TRP1 transmission direction. In all TOs for transmission towards TRP2, a set of DMRS ports corresponding to the sharing configuration are in an cyclic mapping mode, the DMRS port indicated by the $2^{nd}$ second PT-RS indication field is mapped to the first start TO in the corresponding TRP2 transmission direction.

In the embodiment of the disclosure, if the maximum number of uplink transmission layers configured by the network device supported by the UE in the current BWP is greater than two and the number of uplink PT-RS ports is two, the indication message includes a plurality of third PT-RS indication fields.

Each of the third PT-RS indication fields corresponds to one TRP, and the third PT-RS indication field represents transmission towards a corresponding TRP and indicates two DMRS ports associated with the two PT-RS ports.

For example, assuming that beams are transmitted to two TRPs, the $1^{st}$ third PT-RS indication field represents transmission towards TRP1 and indicates the two DMRS ports associated with the two PT-RS ports, and the $2^{nd}$ third PT-RS indication field represents transmission towards TRP2 and indicates the two DMRS ports associated with the two PT-RS ports.

In the embodiment of the disclosure, in all TOs for transmission towards the plurality of TRPs, the PT-RS ports are mapped to the two DMRS ports indicated by the third PT-RS indication field to send the PT-RS. It is predefined or preconfigured that a set of DMRS ports associated with each port of the PT-RS in a plurality of TRP transmission directions.

The set of DMRS ports includes a DMRS port for sending the PT-RS.

For example, assuming that beams are transmitted to two TRPs, in all TOs for transmission towards TRP1, the PT-RS port is mapped onto the two DMRS ports indicated by the $1^{st}$ third PT-RS indication field to send the PT-RS. In all TOs for transmission towards TRP2, the PT-RS port is mapped onto the two DMRS ports indicated by the $2^{nd}$ third PT-RS indication field to send the PT-RS.

In the embodiment of the disclosure, when the UE reports that a PT-RS cyclic mapping mode is supported and the network device configures the UE to perform mapping based on the cyclic mapping mode, the PT-RS ports are cyclically mapped in sequence onto different DMRS ports, among all ports corresponding to a set of associated DMRS ports configured by the network device, and the different DMRS ports are mapped to different TOs for transmission towards a corresponding TRP.

The DMRS port indicated by the third PT-RS indication field is mapped to the first start TO in the corresponding TRP transmission direction.

For example, assuming that beams are transmitted to two TRPs, in all TOs for transmission towards TRP1, each port is cyclically mapped onto the corresponding set of shared DMRS ports, resulting in PT-RS mapping to a set of DMRS ports corresponding to the sharing configuration, where the two DMRS ports indicated by the $1^{st}$ third PT-RS indication field are mapped to the first start TO in the TRP transmission direction. In all TOs for transmission towards TRP2, each port is cyclically mapping onto the corresponding set of shared DMRS ports, resulting in PT-RS mapping to a set of DMRS ports corresponding to the sharing configuration, where the DMRS ports indicated by the $2^{nd}$ third PT-RS indication field is mapped to the first start TO in the TRP transmission direction.

It should be noted that the above possible implementations may be executed individually or in combination, which are not limited in the embodiments of the disclosure.

An embodiment of the disclosure provides another method for enhancing an uplink PT-RS. FIG. 10 is a schematic flowchart of another method for enhancing an uplink PT-RS according to an embodiment of the disclosure. The method for enhancing an uplink PT-RS may be applied to the network device. The method for enhancing an uplink PT-RS may be executed alone, or may be in combination with any embodiment or possible implementation in the embodiment, or may be in combination with any technical solution in the related art.

As shown in FIG. 10, the method for enhancing an uplink PT-RS may include the following steps.

At 701, a supported number of cyclic mapping DMRS ports reported by the UE and the number of DMRS ports configured by the network device are received.

The number of cyclic mapping DMRS ports reported/configured by the UE maps the PT-RS at TOs corresponding to different TRP transmission directions.

In the embodiment of the disclosure, the UE may configure a number of DMRS ports when cyclically mapping transmission beams according to actual needs, and then report the number of ports to the network device, so that the network device receives the supported number of cyclic mapping DMRS ports reported by the UE.

It should be noted that the above possible implementations may be executed individually or in combination, which are not limited in the embodiments of the disclosure.

In order to implement the above embodiments, the disclosure also proposes another method for enhancing an uplink PT-RS. FIG. 11 is a schematic flowchart of another method for enhancing an uplink PT-RS according to an embodiment of the disclosure. The method for enhancing an uplink PT-RS may be applied to a UE. The method for enhancing an uplink PT-RS may be executed alone, or may be in combination with any embodiment or possible implementation in the embodiment, or may be in combination with any technical solution in the related art.

As shown in FIG. 11, the method for enhancing an uplink PT-RS may include the following steps.

At 801, an instruction message sent by a network device is received.

The indication message includes a plurality of pieces of PT-RS indication information that correspond to a plurality of TRPs. The PT-RS indication information represents transmission towards a corresponding TRP, and indicates a DMRS port associated with the corresponding PT-RS port.

As a possible situation in the embodiment of the disclosure, the UE may receive the indication message sent by the network device through DCI.

It should be noted that the explanation of the method for enhancing an uplink PT-RS performed by the network device in any of the embodiments of FIG. 4 to FIG. 10 is also applicable to the method for enhancing an uplink PT-RS performed by the UE in this embodiment. The implementation principle of the method is similar, which may not be repeated here.

In the method for enhancing an uplink PT-RS of the embodiment of the disclosure, the UE receives the indication message sent by the network device, in which the indication message includes pieces of PT-RS indication information corresponding to the plurality of TRPs, the PT-RS indication information represents transmission towards the corresponding TRP and indicates the DMRS port associated with the corresponding PT-RS port. Since the indication message sent to the UE includes the pieces of PT-RS indication information sent towards the corresponding TRP, and each PT-RS indication information indicates the DMRS port associated with the corresponding PT-RS port, a problem is solved that the PT-RS is unable to associate with DMRS ports for different CPE noise sources in the multi-TRP based PUSCH transmission, which is beneficial to improving the system performance.

It should be noted that the above possible implementations may be executed individually or in combination, which are not limited in the embodiments of the disclosure.

Corresponding to the method for enhancing an uplink PT-RS according to the above-mentioned embodiments of FIG. 4 to FIG. 10, the disclosure also provides an apparatus for enhancing an uplink PT-RS. Since the apparatus for enhancing an uplink PT-RS according to the embodiment of the disclosure corresponds to the above-mentioned methods for enhancing an uplink PT-RSs according to the embodiments of FIG. 4 to FIG. 10, the implementations of the method for enhancing an uplink PT-RS is also applicable to the apparatus for enhancing an uplink PT-RS according to the embodiments of the disclosure. The detailed description may not be given in the embodiments of this disclosure.

FIG. 12 is a structural schematic diagram of an apparatus for enhancing an uplink PT-RS according to an embodiment of the disclosure. The apparatus may be applied to a network device.

As shown in FIG. 12, the apparatus 1200 for enhancing an uplink PT-RS may include: a sending module 1201.

The sending module 1201 is configured to send an indication message to a UE, where the indication message includes a plurality of pieces of PT-RS indication information corresponding to a plurality of TRPs, the PT-RS indication information represents transmission towards a corresponding TRP and indicates a DMRS port associated with a corresponding PT-RS port.

Optionally, the sending module 1201 may also be configured to send an indication message to the UE through DCI.

Optionally, the indication message is determined based on a maximum number of uplink transmission layers supported by the UE in a current BWP configured by the network device and a number of PT-RS ports corresponding to uplink transmission of the UE configured by the network device.

Optionally, in response to the maximum number of uplink transmission layers configured by the network device being two and the number of uplink PT-RS ports being one, the DCI includes one corresponding PT-RS indication field:

in response to the maximum number of uplink transmission layers configured by the network device being two and the number of uplink PT-RS ports being two, the indication message is not added to the DCI:

in response to the maximum number of uplink transmission layers configured by the network device being one, the indication message is not added to the DCI:

in response to the maximum number of uplink transmission layers configured by the network device being greater than two, the DCI includes two corresponding independent PT-RS indication fields.

Optionally, respective independent PT-RSs are sent towards the plurality of TRPs, in which each port of the PT-RSs is associated with a DMRS port in a same TRP transmission direction.

Optionally, in response to the maximum number of uplink transmission layers configured by the network device being two and the number of uplink PT-RS ports being one, the indication message includes a first PT-RS indication field, and the first PT-RS indication field includes pieces of PT-RS indication information having one-to one correspondence with PT-RSs sent in a plurality of TRP transmission directions.

Optionally, in all TOs for transmission towards the plurality of TRPs, the PT-RS port is mapped in the PT-RS indication information to send the PT-RS by using a DMRS port indicated by the PT-RS indication information, in which a set of DMRS ports associated with each PT-RS port in the plurality of TRP transmission directions is preconfigured, and the set of DMRS ports includes a DMRS port for sending the PT-RS.

Optionally, when the UE reports that a PT-RS cyclic mapping mode is supported and the network device configures the UE to perform mapping based on the cyclic mapping mode, each PT-RS port is cyclically mapped onto different DMRS ports associated with the PT-RS port in sequence, among all ports consisting of a set of DMRS ports associated with each PT-RS port configured by the network device, to send the PT-RS, and the PT-RS is sent by using a DMRS port associated with the PT-RS port at different TOs in a corresponding TRP transmission direction, in which the DMRS port indicated by the PT-RS indication information is mapped to a first start TO in the corresponding TRP transmission direction.

Optionally, in response to the maximum number of uplink transmission layers configured by the network device being greater than two and the number of uplink PT-RS ports being one, the indication message includes a plurality of second PT-RS indication fields, in which each of the second PT-RS indication fields corresponds to one TRP, the second PT-RS indication field represents transmission towards a corresponding TRP and indicates a DMRS port associated with a corresponding PT-RS port.

Optionally, in all TOs for transmission towards the plurality of TRPs, the PT-RS port is mapped onto the DMRS port indicated by the second PT-RS indication field to send the PT-RS, in which a set of DMRS ports associated with the PT-RS port in a plurality of TRP transmission directions is preconfigured, and the set of DMRS ports includes a DMRS port for sending the PT-RS.

Optionally, when the UE reports that a PT-RS cyclic mapping mode is supported and the network device configures the UE to perform mapping based on the cyclic mapping mode, the PT-RS port is cyclically carried on different DMRS ports in sequence, among all ports corresponding to a set of associated DMRS ports configured by the network device, to send the PT-RS, and the different DMRS ports is mapped to corresponding different TOs for transmission towards a corresponding TRP, in which the DMRS port indicated by the second PT-RS indication field is mapped to a first start TO in the corresponding TRP transmission direction.

Optionally, in response to the maximum number of uplink transmission layers configured by the network device being greater than two and the number of uplink PT-RS ports being two, the indication message includes a plurality of third PT-RS indication fields, in which each of the third PT-RS indication fields corresponds to one TRP, the third PT-RS indication field represents transmission towards a corresponding TRP and indicates two DMRS ports associated with the two PT-RS ports.

Optionally, in all TOs for transmission towards the plurality of TRPs, the PT-RS ports are mapped onto the two DMRS ports indicated by the third PT-RS indication fields to send the PT-RS, in which a set of DMRS ports associated with each port of the PT-RS in a plurality of TRP transmission directions is preconfigured, and the set of DMRS ports includes a DMRS port for sending the PT-RS.

Optionally, when the UE reports that a PT-RS cyclic mapping mode is supported and the network device configures the UE to perform mapping based on the cyclic mapping mode, the PT-RS is cyclically mapped onto different DMRS ports, among all ports corresponding to a set of associated DMRS ports configured by the network device, to send the PT-RS, and the different DMRS ports are mapped to corresponding different TOs for transmission towards a corresponding TRP, in which the DMRS port indicated by the third PT-RS indication field is mapped to a first start TO in the corresponding TRP transmission direction.

Optionally, the apparatus 1200 for enhancing an uplink PT-RS may also include: a receiving module, configured to receive a supported number of cyclic mapping DMRS ports reported by the UE and the number of DMRS ports configured by the network device, in which the number of cyclic mapping DMRS ports reported by the UE maps the PT-RS port at TOs corresponding to different TRP transmission directions.

With the apparatus for enhancing an uplink PT-RS in the embodiment of the disclosure, the network device sends an indication message to the UE. The indication message includes pieces of PT-RS indication information corresponding to the plurality of TRPs, the PT-RS indication information represents transmission towards the corresponding TRP and indicates the DMRS port associated with the corresponding PT-RS port. Since the indication message sent to the UE includes the pieces of PT-RS indication information sent towards the corresponding TRP, and each PT-RS indication information indicates the DMRS port associated with the corresponding PT-RS port, a problem is solved that the PT-RS is unable to associate with DMRS ports for different CPE noise sources in the multi-TRP based PUSCH transmission, which is beneficial to improving the system performance.

It should be noted that the above possible implementations may be executed individually or in combination, which are not limited in the embodiments of the disclosure.

Corresponding to the method for enhancing an uplink PT-RS according to the above-mentioned embodiment of FIG. 11, the disclosure also provides an apparatus for enhancing an uplink PT-RS. Since the apparatus for enhancing an uplink PT-RS according to the embodiment of the disclosure corresponds to the method for enhancing an uplink PT-RS according to the above-mentioned embodiment of FIG. 11, the implementations of the method for enhancing an uplink PT-RS is also applicable to the apparatus for enhancing an uplink PT-RS according to the embodiment of the disclosure. The detailed description may not be given in the embodiments of this disclosure.

FIG. 13 is a structural schematic diagram of another apparatus for enhancing an uplink PT-RS according to an embodiment of the disclosure. The apparatus may be applied to the UE.

As shown in FIG. 13, the apparatus 1300 for enhancing an uplink PT-RS may include: a receiving module 1301, configured to receive an indication message sent by a network device. The indication message includes a plurality of pieces of PT-RS indication information corresponding to a plurality of TRPs, and the PT-RS indication information represents transmission towards a corresponding TRP and indicates a demodulation reference signal (DMRS) port associated with a corresponding PT-RS port.

Optionally, the receiving module 1301 may also be configured to receive the indication message sent by the network device through DCI.

With the apparatus for enhancing an uplink PT-RS in the embodiment of the disclosure, the UE receives the indication message sent by the network device. The indication message includes pieces of PT-RS indication information corresponding to the plurality of TRPs, the PT-RS indication information represents transmission towards the corresponding TRP and indicates the DMRS port associated with the corresponding PT-RS port. Since the indication message sent to the UE includes the pieces of PT-RS indication information sent towards the corresponding TRP, and each PT-RS indication information indicates the DMRS port associated with the corresponding PT-RS port, a problem is solved that the PT-RS is unable to associate with DMRS ports for different CPE noise sources in the multi-TRP based PUSCH transmission, which is beneficial to improving the system performance.

It should be noted that the above possible implementations may be executed individually or in combination, which are not limited in the embodiments of the disclosure.

In order to implement the above embodiments, the disclosure also proposes a communication device.

The communication device according to the embodiment of the disclosure includes a processor, a transceiver, a memory, and an executable program stored in the memory and capable of being run by the processor. When the processor runs the executable program, the foregoing method is carried out.

The communication device may be the aforementioned terminal device, access network device or core network device.

The processor may include various types of storage media, which are non-transitory computer storage media that may continue to memorize information stored on the communication device after the communication device is powered off. Here, the communication device includes a terminal device, an access network device or a core network device.

The processor may be connected to the memory through a bus or the like, and be used to read the executable program stored in the memory, for example, according to at least one of FIG. 4 to FIG. 11.

In order to implement the above embodiments, the disclosure also proposes a computer storage medium.

The computer storage medium according to the embodiment of the disclosure has an executable program stored. When the executable program is executed by the processor, the foregoing method may be implemented, for example, according to at least one of FIG. 4 to FIG. 11.

Figure 14:
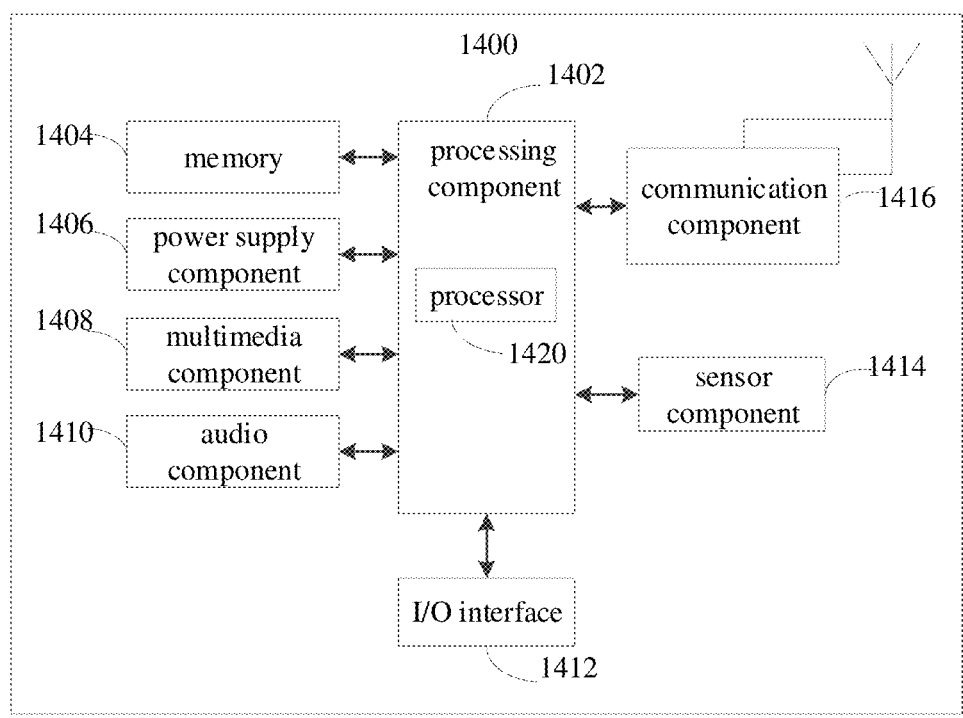
FIG. 14 is a block diagram of a user equipment according to an embodiment of the disclosure.

FIG. 14 is a block diagram of a UE according to an embodiment of the disclosure. For example, the UE 1400 may be a mobile phone, a computer, a digital broadcast user device, a messaging device, a gaming console, a tablet device, a medical device, a fitness device, a personal digital assistant, or the like.

Referring to FIG. 14, the UE 1400 may include at least one of the following components: a processing component 1402, a memory 1404, a power supply component 1406, a multimedia component 1408, an audio component 1410, an input/output (I/O) interface 1412, a sensor component 1414, and a communication component 1416.

The processing component 1402 generally controls overall operations of the UE 1400, such as operations associated with display, phone calls, data communications, camera operations, and recording operations. The processing component 1402 may include at least one processor 1420 to execute instructions to complete all or part of the steps of the above methods. Additionally, the processing component 1402 may include at least one module that facilitates interactions between the processing component 1402 and other components. For example, the processing component 1402 may include a multimedia module to facilitate interactions between the multimedia component 1408 and the processing component 1402.

The memory 1404 is configured to store various types of data to support operations at the UE 1400. Examples of such data include instructions for any application or method operating on the UE 1400, contact data, phonebook data, messages, pictures, videos, etc. The memory 1404 may be implemented by any type of volatile or non-volatile storage device, or their combination, such as a static random access memory (SRAM), an electrically erasable programmable read-only memory (EEPROM), an erasable programmable read-only memory (EEPROM), a programmable read-only memory (EPROM), a programmable read-only memory (PROM), a read-only memory (ROM), a magnetic memory, a flash memory, a magnetic or optical disk.

The power supply component 1406 provides powers to various components of the UE 1400. The power supply components 1406 may include a power management system, at least one power supply, and other components associated with generating, managing, and distributing power to the UE 1400.

The multimedia component 1408 includes a screen that provides an output interface between the UE 1400 and the user. In some embodiments, the screen may include a liquid crystal display (LCD) and a touch panel (TP). If the screen includes a touch panel, the screen may be implemented as a touch screen to receive input signals from the user. The touch panel includes at least one touch sensor to sense touches, slides, and gestures on the touch panel. The touch sensor may not only sense a boundary of the touch or sliding operation, but also detect a wake-up time and pressure related to the touch or sliding operation. In some embodiments, the multimedia component 1408 includes a front-facing camera and/or a rear-facing camera. When the UE 1400 is in an operating mode, such as a shooting mode or a video mode, the front camera and/or the rear camera may receive external multimedia data. Each of the front camera and rear camera may be a fixed optical lens system or have a focal length and optical zoom capabilities.

The audio component 1410 is configured to output and/or input audio signals. For example, the audio component 1410 includes a microphone (MIC) configured to receive external audio signals when the UE 1400 is in operating modes, such as a call mode, a recording mode, and a voice recognition mode. The received audio signals may be further stored in the memory 1404 or sent via the communications component 1416. In some embodiments, the audio component 1410 also includes a speaker for outputting audio signals.

The I/O interface 1412 provides an interface between the processing component 1402 and a peripheral interface module. The peripheral interface module may be a keyboard, a click wheel, a button, etc. These buttons may include, but are not limited to: a home button, volume buttons, a start button, and a lock button.

The sensor component 1414 includes at least one sensor for providing various aspects of status assessment for the UE 1400. For example, the sensor component 1414 may detect an open/closed state of the UE 1400 and a relative positioning of components, such as the display and keypad of the UE 1400. The sensor component 1414 may also detect changes in position of the UE 1400 or components of the UE 1400, a presence or absence of user contact with the UE 1400, an orientation or acceleration/deceleration of the UE 1400 and temperature changes of the UE 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an acceleration sensor, a gyroscope sensor, a magnetic sensor, a pressure sensor, or a temperature sensor.

The communication component 1416 is configured to facilitate wired or wireless communications between the UE 1400 and other devices. The UE 1400 may access a wireless network based on a communication standard, such as WiFi, 2G or 3G, or their combination. In an exemplary embodiment, the communication component 1416 receives broadcast signals or broadcast related information from an external broadcast management system via a broadcast channel. In an exemplary embodiment, the communication component 1416 also includes a near field communications (NFC) module to facilitate short-range communications. For example, the NFC module may be implemented based on radio frequency identification (RFID) technology, infrared data association (IrDA) technology, ultra-wideband (UWB) technology, Bluetooth (BT) technology and other technologies.

In an exemplary embodiment, the UE 1400 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronic components to execute the above-mentioned method for enhancing an uplink PT-RS in the embodiment of FIG. 11.

In an exemplary embodiment, a non-transitory computer-readable storage medium including instructions is also provided, such as the memory 1404 including instructions, which may be executed by the processor 1420 of the UE 1400 to complete the above method. For example, the non-transitory computer-readable storage medium may be a ROM, a random access memory (RAM), a CD-ROM, a magnetic tape, a floppy disk, an optical data storage device, etc.

Figure 15:
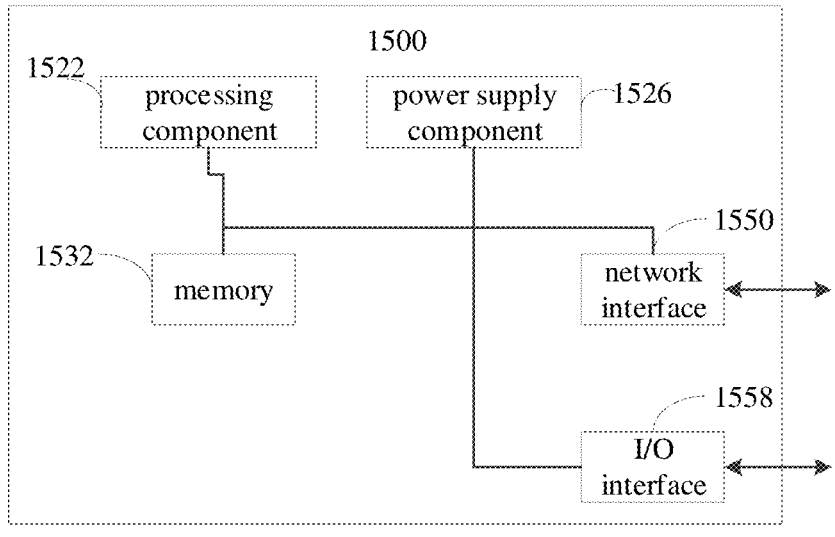
FIG. 15 is a structural schematic diagram of a network device according to an embodiment of the disclosure.

As shown in FIG. 15, it is a structural schematic diagram of a network device according to an embodiment of the disclosure. The network device may be the access network device or the core network device in the above embodiment. Referring to FIG. 15, the network device 1500 includes a processing component 1522, which further includes at least one processor, and a memory resource represented by a memory 1532 for storing instructions, such as application programs, that can be executed by the processing component 1522. The application program stored in the memory 1532 may include one or more modules, each corresponding to a set of instructions. In addition, the processing component 1522 is configured to execute instructions to perform any of the above-mentioned methods applied to the access network device or the core network device, for example, the method for enhancing an uplink PT-RS in any embodiment of FIG. 4 to FIG. 10.

The network device 1500 may also include a power supply component 1526 configured to perform power management of the network device 1500, a wired or wireless network interface 1550 configured to connect the network device 1500 to the network, and an input/output (I/O) interface 1558. The network device 1500 may operate based on an operating system stored in the memory 1532, such as Windows Server™, Mac OS X™, Unix™, Linux™, Free-BSD™ or the like.

Other embodiments of the disclosure may be readily apparent to those skilled in the art from consideration of the specification and practice of the invention disclosed herein. The disclosure is intended to cover any variations, uses, or adaptations of the invention that follow the general principles of the invention and include common knowledge or conventional technical means in the technical field that are not disclosed in the invention. The specification and examples are only considered as exemplary, with a true scope and spirit of the disclosure being indicated by the following claims.

It should be understood that the disclosure is not limited to the precise structures described above and illustrated in the accompanying drawings, and various modifications and changes may be made without departing from the scope of the disclosure. The scope of the disclosure is limited only by the appended claims.

What is claimed is:

1. A method for enhancing an uplink phase tracking reference signal (PT-RS), performed by a network device, the method comprising:

determining an indication message based on a maximum number of uplink transmission layers configured by the network device and a number of PT-RS ports corresponding to uplink transmission of a user equipment (UE) configured by the network device; and sending the indication message to the UE through downlink control information (DCI), wherein the indication message comprises a plurality of pieces of PT-RS indication information corresponding to a plurality of transmission reception points (TRPs), and the PT-RS indication information sent towards a corresponding TRP indicates a demodulation reference signal (DMRS) port associated with a corresponding PT-RS port;

wherein in response to the maximum number of uplink transmission layers configured by the network device being two and the number of uplink PT-RS ports being one, the indication message comprises a first PT-RS indication field, and the first PT-RS indication field comprises respective PT-RS indication information corresponding to PT-RSs sent in a plurality of TRP transmission directions;

in response to the maximum number of uplink transmission layers configured by the network device being one, the indication message is not added to the DCI; or in response to the maximum number of uplink transmission layers configured by the network device being greater than two, the DCI comprises two independent PT-RS indication fields.

2. The method of claim 1, further comprising:

sending respective independent PT-RSs towards the plurality of TRPs, wherein each port of the PT-RSs is associated with a DMRS port in a same TRP transmission direction.

3. The method of claim 1, further comprising:

in all transmission occasions (TOs) for transmission towards the plurality of TRPs, mapping the PT-RS port in the PT-RS indication information to send the PT-RS by using a DMRS port indicated by the PT-RS indication information, wherein a set of DMRS ports associated with each PT-RS port in the plurality of TRP transmission directions is preconfigured, wherein the set of DMRS ports comprises a DMRS port for sending the PT-RS.

4. The method of claim 1, further comprising:

when the UE reports that a PT-RS cyclic mapping mode is supported and the network device configures the UE to perform mapping based on the cyclic mapping mode, cyclically mapping each PT-RS port onto different DMRS ports associated with the PT-RS port, among all ports consisting of a set of DMRS ports associated with each PT-RS port configured by the network device, to send the PT-RS, and sending the PT-RS by using a DMRS port associated with the PT-RS port at different transmission occasions (TOs) in a corresponding TRP transmission direction, wherein the DMRS port indicated by the PT-RS indication information is mapped to a first start TO in the corresponding TRP transmission direction.

5. The method of claim 1, wherein in response to the maximum number of uplink transmission layers configured by the network device being greater than two and the number of uplink PT-RS ports being one, the indication message comprises a plurality of second PT-RS indication fields, wherein each of the second PT-RS indication fields corresponds to one TRP, and the second PT-RS indication field sent towards a corresponding TRP indicates a DMRS port associated with a corresponding PT-RS port.

6. The method of claim 5, further comprising:

in all transmission occasions (TOs) for transmission towards the plurality of TRPs, mapping the PT-RS port in the second PT-RS indication field to send the PT-RS by using the DMRS port indicated by the second PT-RS indication field, wherein a set of DMRS ports associated with the PT-RS port in a plurality of TRP transmission directions is preconfigured, and the set of DMRS ports comprises a DMRS port for sending the PT-RS.

7. The method of claim 5, further comprising:

when the UE reports that a PT-RS cyclic mapping mode is supported and the network device configures the UE to perform mapping based on the cyclic mapping mode, cyclically carrying the PT-RS port in sequence in the PT-RS indication information indicating different DMRS ports, among all ports corresponding to a set of associated DMRS ports configured by the network device, and mapping the different DMRS ports to corresponding different TOs for transmission towards a corresponding TRP, wherein the DMRS port indicated by the second PT-RS indication field is mapped to a first start TO in the corresponding TRP transmission direction.

8. The method of claim 1, wherein in response to the maximum number of uplink transmission layers configured by the network device being greater than two and the number of uplink PT-RS ports being two, the indication message comprises a plurality of third PT-RS indication fields, wherein each of the third PT-RS indication fields corresponds to one TRP, and the third PT-RS indication field sent towards a corresponding TRP indicates two DMRS ports associated with the two PT-RS ports.

9. The method of claim 8, further comprising:

in all transmission occasions (TOs) for transmission towards the plurality of TRPs, mapping the PT-RS ports in the third PT-RS indication fields to send the PT-RS by using the two DMRS ports indicated by the third PT-RS indication fields, wherein a set of DMRS ports associated with each port of the PT-RS in a plurality of TRP transmission directions is preconfigured, and the set of DMRS ports comprises a DMRS port for sending the PT-RS.

10. The method of claim 8, further comprising:

when the UE reports that a PT-RS cyclic mapping mode is supported and the network device configures the UE to perform mapping based on the cyclic mapping mode, cyclically mapping the PT-RSs in sequence in the PT-RS indication information indicating different DMRS ports, among all ports corresponding to a set of associated DMRS ports configured by the network device, and mapping the different DMRS ports to corresponding different TOs for transmission towards a corresponding TRP, wherein the DMRS port indicated by the third PT-RS indication field is mapped to a first start TO in the corresponding TRP transmission direction.

11. The method according to claim 1, further comprising:

receiving a supported number of cyclic mapping DMRS ports reported by the UE and a number of DMRS ports configured by the network device, wherein the supported number of cyclic mapping DMRS ports reported by the UE maps the PT-RS port at TOs corresponding to different TRP transmission directions.

12. A network device, comprising:

a transceiver;

a memory; and a processor, respectively connected to the transceiver and the memory;

wherein the processor is configured to perform the method of claim 1.

13. A method for enhancing an uplink phase tracking reference signal (PT-RS), performed by a user equipment (UE), the method comprising:

receiving an indication message sent by a network device through downlink control information (DCI), wherein the indication message comprises a plurality of pieces of PT-RS indication information corresponding to a plurality of transmission reception points (TRPs), and the PT-RS indication information sent towards a corresponding TRP indicates a demodulation reference signal (DMRS) port associated with a corresponding PT-RS port;

wherein the indication message is determined based on a maximum number of uplink transmission layers configured by the network device and a number of PT-RS ports corresponding to uplink transmission of the UE configured by the network device;

wherein in response to the maximum number of uplink transmission layers configured by the network device being two and the number of uplink PT-RS ports being one, the indication message comprises a first PT-RS indication field, and the first PT-RS indication field comprises respective PT-RS indication information corresponding to PT-RSs sent in a plurality of TRP transmission directions;

in response to the maximum number of uplink transmission layers configured by the network device being one, the indication message is not added to the DCI; or in response to the maximum number of uplink transmission layers configured by the network device being greater than two, the DCI comprises two independent PT-RS indication fields.

14. A user equipment (UE), comprising:

a transceiver;

a memory; and a processor, respectively connected to the transceiver and the memory;

wherein the processor is configured to:

receive an indication message sent by a network device through downlink control information (DCI), wherein the indication message comprises a plurality of pieces of uplink phase tracking reference signal (PT-RS) indication information corresponding to a plurality of transmission reception points (TRPs), and the PT-RS indication information sent towards a corresponding TRP indicates a demodulation reference signal (DMRS) port associated with a corresponding PT-RS port;

wherein the indication message is determined based on a maximum number of uplink transmission layers configured by the network device and a number of PT-RS ports corresponding to uplink transmission of the UE configured by the network device;

wherein in response to the maximum number of uplink transmission layers configured by the network device being two and the number of uplink PT-RS ports being one, the indication message comprises a first PT-RS indication field, and the first PT-RS indication field comprises respective PT-RS indication information corresponding to PT-RSs sent in a plurality of TRP transmission directions;

in response to the maximum number of uplink transmission layers configured by the network device being one, the indication message is not added to the DCI; or in response to the maximum number of uplink transmission layers configured by the network device being greater than two, the DCI comprises two independent PT-RS indication fields.

* * * * *